United States Patent
Masaki

(10) Patent No.: US 9,164,279 B2
(45) Date of Patent: Oct. 20, 2015

(54) OPPOSED SCANNING TYPE SCANNING OPTICAL DEVICE AND IMAGE FORMING APPARATUS INCLUDING THE SAME

(71) Applicant: KYOCERA Document Solutions Inc., Osaka (JP)

(72) Inventor: Akihiro Masaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/457,336

(22) Filed: Aug. 12, 2014

(65) Prior Publication Data

US 2015/0062275 A1    Mar. 5, 2015

(30) Foreign Application Priority Data

Aug. 30, 2013   (JP) .................. 2013-178911

(51) Int. Cl.
| | | |
|---|---|---|
| *B41J 15/14* | (2006.01) | |
| *B41J 2/385* | (2006.01) | |
| *G02B 26/12* | (2006.01) | |
| *G02B 7/02* | (2006.01) | |
| *G03G 15/043* | (2006.01) | |

(52) U.S. Cl.
CPC .............. *G02B 26/125* (2013.01); *G02B 7/028* (2013.01); *G03G 15/0435* (2013.01)

(58) Field of Classification Search
CPC ............ G02B 1/04; G02B 7/08; G02B 7/102; G02B 7/36

USPC ........................ 347/263, 242; 359/198.1, 196
See application file for complete search history.

(56) References Cited

U.S. PATENT DOCUMENTS

| | | | | |
|---|---|---|---|---|
| 6,657,760 | B2 * | 12/2003 | Fukita et al. ............... | 359/198.1 |
| 2007/0206256 | A1 * | 9/2007 | Itabashi ......................... | 359/196 |
| 2009/0115834 | A1 * | 5/2009 | Nakajima ..................... | 347/263 |

FOREIGN PATENT DOCUMENTS

| | | | |
|---|---|---|---|
| JP | 03084513 | * | 4/1991 |
| JP | H05-203889 A | | 8/1993 |

* cited by examiner

*Primary Examiner* — Julian Huffman
*Assistant Examiner* — Carlos A Martinez
(74) *Attorney, Agent, or Firm* — Studebaker & Brackett PC

(57) ABSTRACT

A scanning optical device includes a deflector deflecting a light beam emitted from a light source, and a pair of optical component groups arranged on both sides of the deflector in a sub-scanning direction and focusing the light beams deflected by the deflector to form images on a surface of an image carrier. Each of the optical component groups has a lens focusing the light beam deflected by the deflector in the sub-scanning direction, and a mirror reflecting the light beam passed through the lens toward the surface of the image carrier. One lens of one optical component group and the other lens of the other optical component group are supported so as to deform in the opposite directions each other in the sub-scanning direction when they are thermally deformed.

6 Claims, 7 Drawing Sheets

OPPOSED SCANNING TYPE SCANNING OPTICAL DEVICE AND IMAGE FORMING APPARATUS INCLUDING THE SAME

INCORPORATION BY REFERENCE

This application is based on and claims the benefit of priority from Japanese Patent application No. 2013-178911 filed on Aug. 30, 2013, the entire contents of which are incorporated herein by reference.

BACKGROUND

The present disclosure relates to a scanning optical device configured to scan and expose a photosensitive drum with a laser beam and an image forming apparatus provided with the scanning optical unit.

An image forming apparatus is generally provided with a scanning optical device constituted of a laser scanning unit exposing a photosensitive drum with a laser beam and forming an electrostatic latent image on the photosensitive drum. The scanning optical device includes a light source emitting the laser beam, a deflector deflecting the laser beam, optical component groups containing lenses and mirrors and an optical box storing the light source, the deflector and the optical groups.

The scanning optical device has an opposed scanning type configured such that a pair of optical component groups are symmetrically arranged with respect to the deflector in the optical box and radiate laser beams on two photosensitive drums to form an latent image on each photoconductive drum. In such the scanning optical device of an opposed scanning type, a fθ lens focusing the laser beam in a sub-scanning direction may be deformed so as to curve in the sub-scanning direction due to temperature rising in the optical box. When the fθ lens is deformed in the sub-scanning direction in the scanning optical device of an opposed scanning type, the images formed on two photoconductive drums curve in opposite directions each other in the sub-scanning direction. As a result, color registration cannot be aligned and, therefore, deterioration of image quality, such as color irregularity and the others, is caused.

The lenses, such as the fθ lens, are often adhered to the optical box using an adhesive in view of material cost and automation of assembly. In such a case, because of a difference in linear expansion coefficients between a material of the lens and a material of the optical box, it is necessary to absorb a difference between the deformed amounts of the lens and the optical box when they are thermally deformed. Usually, since a linier expansion coefficient of the optical box is smaller than that of the lens, a deformed amount of the lens is larger than that of the optical box. Therefore, if the lens may be adhered to the optical box with multiple adhesion positions, the difference between the deformed amounts cannot be absorbed to cause a partial distorsion on the lens and peeling of the adhesive. On the other hand, if the lens may be adhered at one adhesion position near the center, although the difference between the deformed amounts can be absorbed, some problems may be occurred. For example, a posture of the lens may become unstable depending on the adhesion position of the lens, the lens may be easily detached due to lack of adhesive strength and vibration may occur easily.

Therefore, in the scanning optical device, in order to support the lenses stably while absorbing the difference between the deformed amounts of the lens and the optical box, the both ends of the fθ lens may be pressed with plate springs. Alternatively, one end of the fθ lens may be pressed with a plate spring while pressing the other end against a positioning rib.

However, in the above-mentioned scanning optical device employing the plate spring, although the difference in the linear expansion coefficients can be absorbed by deformation of the plate spring, if impact and vibration may be applied during transportation or another situation, some problems, such as a displacement of the fθ lens from a predetermined position and difficulty in automation of assembly, may be caused.

SUMMARY

In accordance with an embodiment of the present disclosure, a scanning optical device includes a deflector deflecting a light beam emitted from a light source, and a pair of optical component groups arranged on both sides of the deflector in a sub-scanning direction and focusing the light beams deflected by the deflector to form images on a surface of an image carrier. Each of the optical component groups has a lens focusing the light beam deflected by the deflector in the sub-scanning direction, and a mirror reflecting the light beam passed through the lens toward the surface of the image carrier. One lens of one optical component group and the other lens of the other optical component group are supported so as to deform in the opposite directions each other in the sub-scanning direction when they are thermally deformed.

In accordance with an embodiment of the present disclosure, an image forming apparatus includes a scanning optical device. The scanning optical device has a deflector deflecting a light beam emitted from a light source, and a pair of optical component groups arranged on both sides of the deflector in a sub-scanning direction and focusing the light beams deflected by the deflector to form images on a surface of an image carrier. Each of the optical component groups has a lens focusing the light beam deflected by the deflector in the sub-scanning direction, and a mirror reflecting the light beam passed through the lens toward the surface of the image carrier. One lens of one optical component group and the other lens of the other optical component group are supported so as to deform in the opposite directions each other in the sub-scanning direction when they are thermally deformed.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 5A is a front view and FIG. 5B is a plan view.

FIG. 7A is a back view showing the second fθ lens of the first optical component group, FIG. 7B is a front view showing the second fθ lens of the second optical component group.

DETAILED DESCRIPTION

Hereinafter, with reference to figures, a scanning optical device and an image forming apparatus according to an embodiment of the present disclosure will be described.

Figure 1:
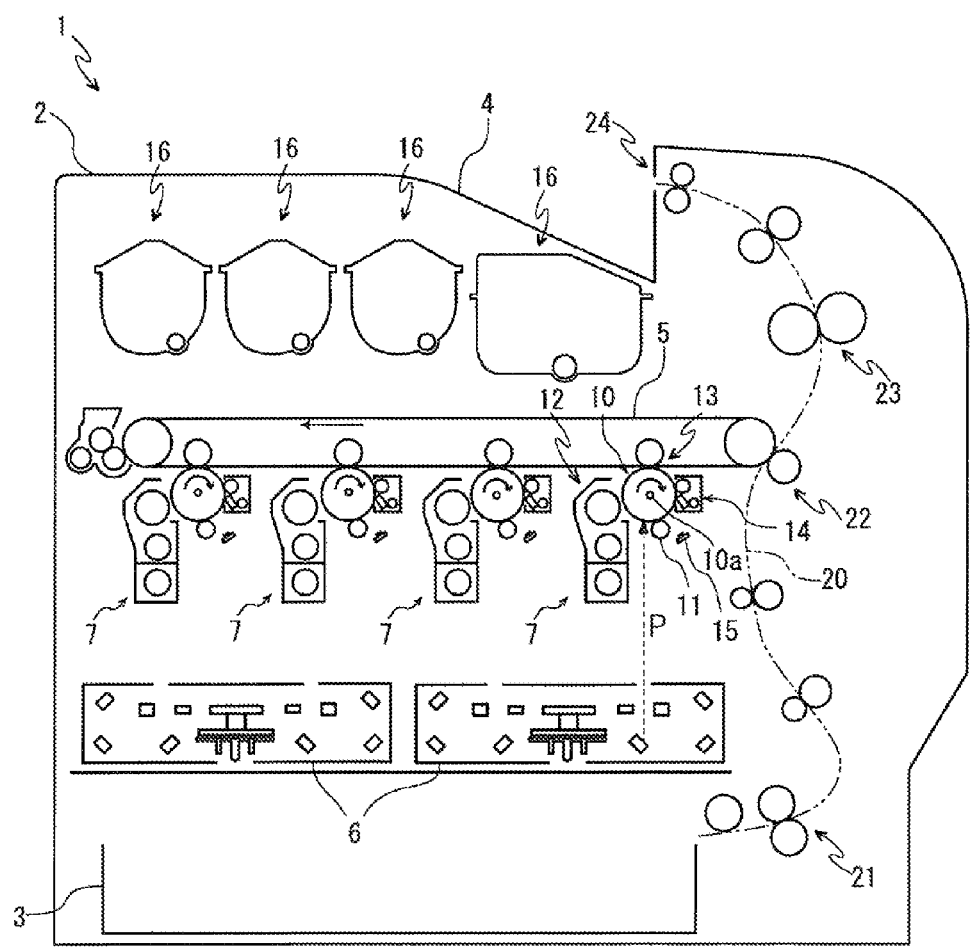
FIG. 1 is a schematic diagram schematically showing a color printer according to an embodiment of the present disclosure.

First, with reference to FIG. 1, the entire structure of a color printer 1 as an electrographic image forming apparatus will be described. FIG. 1 is a schematic diagram schematically showing a color printer according to an embodiment of the present disclosure. Hereinafter, the left-hand side of FIG. 1 indicates a front side of the printer 1. Directions orthogonal to the front and back directions viewed from the front side indicate left and right directions.

The color printer 1 includes a box-like formed printer main body 2. In a lower part of the printer main body 2, a sheet feeding cartridge 3 storing recording sheets (not shown) is installed and, in a top face of the printer main body 2, a sheet ejected tray 4 is formed.

In an upper part of the printer main body 2, an intermediate transferring belt 5 is bridged over a plurality of rollers and, below the intermediate transferring belt 5, two scanning optical devices 6 constituted of a laser scanning unit (LSU) are arranged side by side in the front and back directions. Under the intermediate transferring belt 5, four image forming units 7 are provided for respective colors (for example, four colors of magenta, cyan, yellow and black) of toners (developers). Since the above-mentioned four image forming parts 8 have the similar configuration, hereinafter, one of the four image forming units 7 will be described. In each image forming unit 7, a photosensitive drum 10 (image carrier) is rotatably provided by a supporting shaft 10a. Around the photosensitive drum 10, a charger 11, a development device 12, a first transferring unit 13, a cleaning device 14 and a static eliminator 15 are arranged along the rotation direction (refer to as an arrow in FIG. 1) of the photosensitive drum 10. Above each development device 12, a toner container 16 is provided In a back part of the printer main body 2, a sheet conveying path 20 is provided. At an upper stream end of the conveying path 20, a sheet feeder 21 is provided. At an intermediate stream part of the conveying path 20, a second transferring unit 22 is provided at the back end of the intermediate transferring belt 6. At a lower stream part of the conveying path 20, a fixing part 23 is provided. At a lower stream end of the conveying path 20, a sheet ejecting port 24 is provided.

Next, the operation of forming an image by the color printer 1 having such a configuration will be described.

When the power is supplied to the color printer 1, various parameters are initialized and initial determination, such as temperature determination of the fixing part 23, is carried out. Subsequently, when image data is inputted and a printing start is directed from a computer or the like connected with the color printer 1, the image forming operation is carried out as follows.

First, the surface of the photosensitive drum 10 is electrically charged by the charger 11. Then, the surface of each photosensitive drums 10 is irradiated with a laser (refer to an arrow P) emitted from two scanning optical devices 6, thereby forming an electrostatic latent image on the surface of each photosensitive drum 10. The electrostatic latent image is then developed to a toner image having a correspondent color by the development device 12. The toner image is first-transferred onto the surface of the intermediate transferring belt 5 in the first transferring unit 13. The above-mentioned operation is repeated in order by the image forming units 7, thereby forming the toner image having full color on the intermediate transferring belt 5. Toner and electric charge remained on the photosensitive drum 10 are eliminated by the cleaning device 14 and static eliminator 15, respectively.

On the other hand, a sheet fed from the sheet feeding cartridge 3 or a manual bypass tray (not shown) by the sheet feeder 21 is conveyed to the second transferring unit 22 in a suitable timing for the above-mentioned image forming operation. Then, in the second transferring unit 22, the toner image having full color on the intermediate transferring belt 5 is second-transferred onto the sheet. The sheet with the second-transferred toner image is conveyed to a lower stream side on the conveying path 20 to enter the fixing part 23, and then, the toner image is fixed on the sheet in the fixing part 23. The sheet with the fixed toner image is ejected from the first sheet ejecting port 24 on the sheet ejecting tray 4.

Figure 2:
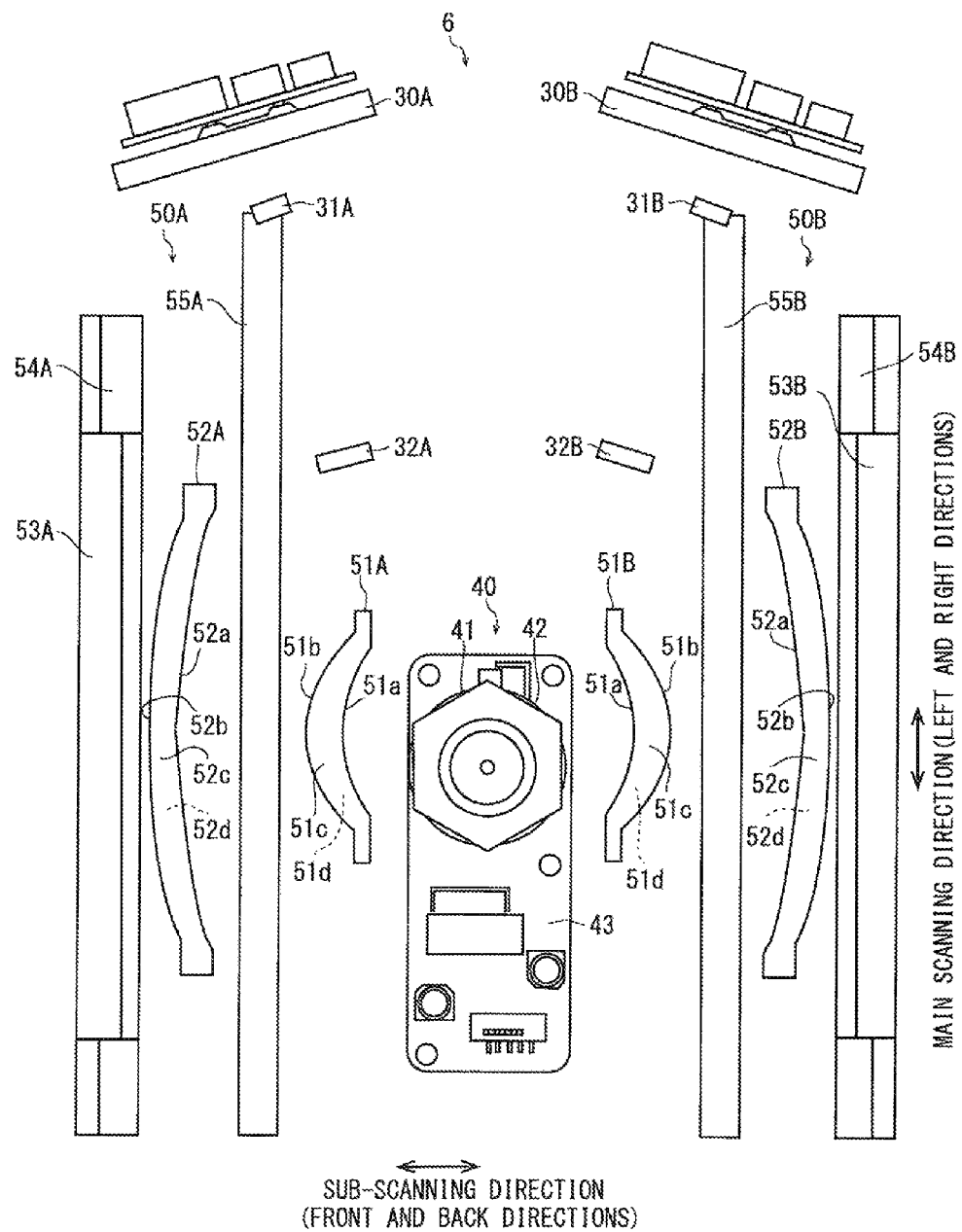
FIG. 2 is a plan view showing a scanning optical device in the color printer according to the embodiment of the present disclosure.
Figure 3:
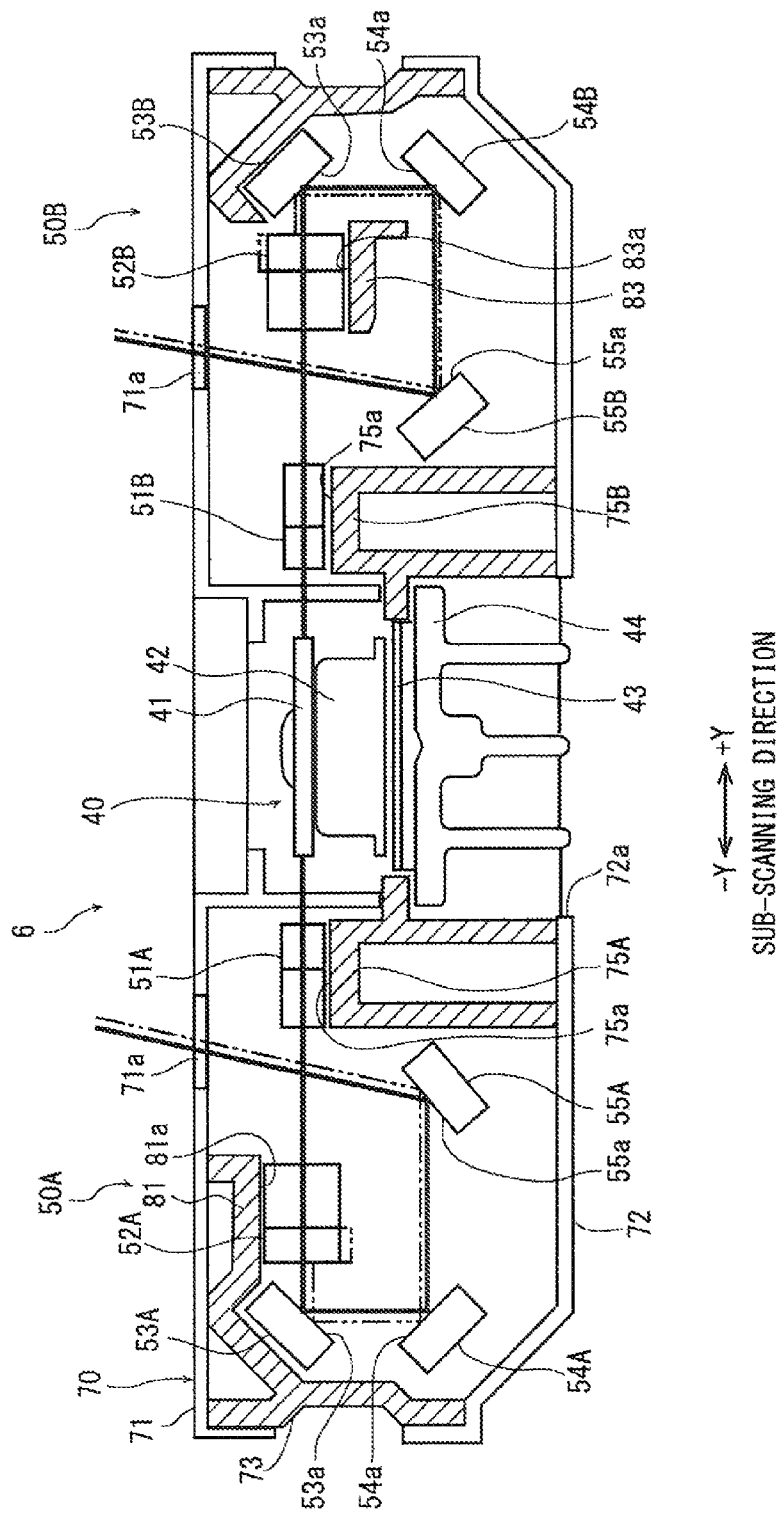
FIG. 3 is a sectional view showing the scanning optical device in the color printer according to the embodiment of the present disclosure.
Figure 4A:
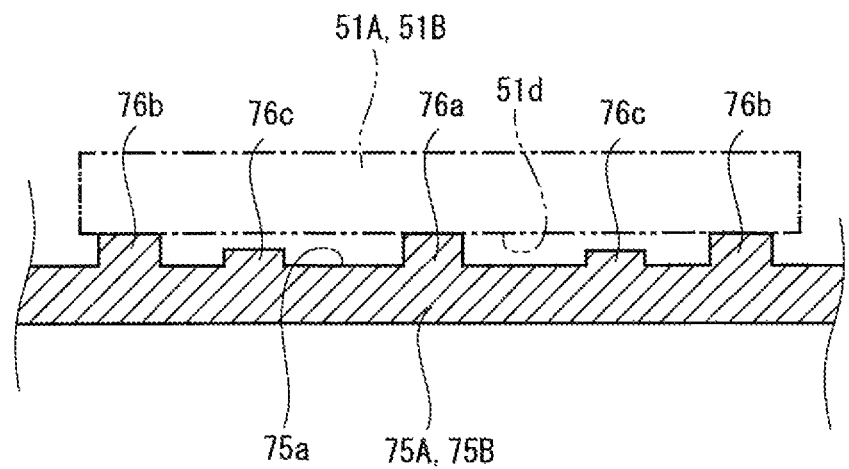
FIG. 4A is a front and FIG. 4B is a plan view each showing a pedestal of the scanning optical device in the color printer according to the embodiment of the present disclosure.
Figure 4B:
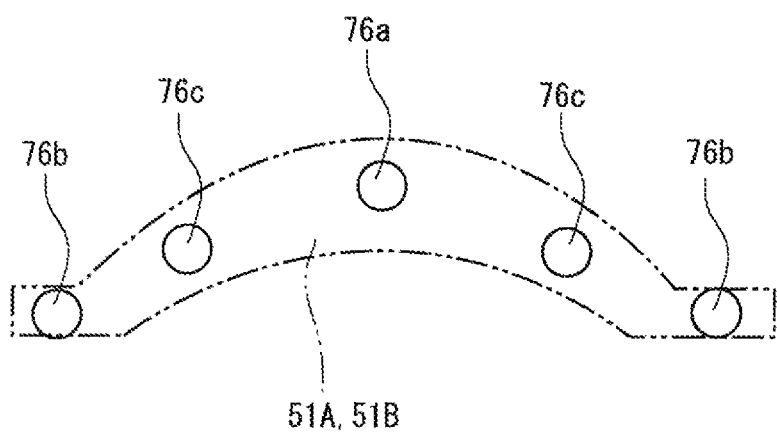
Figure 5A:
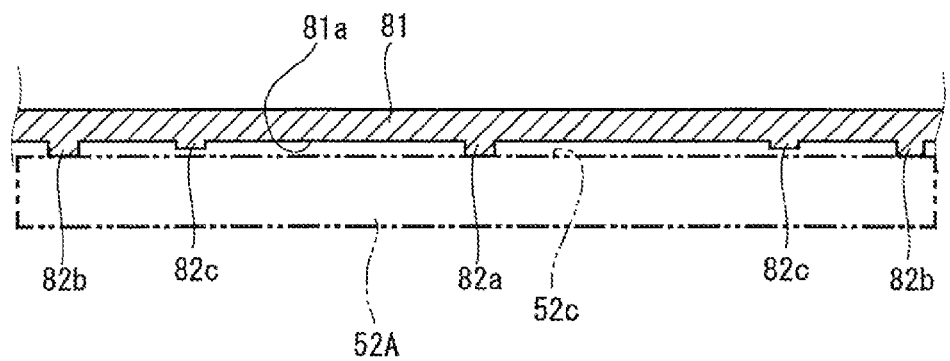
FIG. 5A is a front and FIG. 5B is a plan view each showing a first frame part of an optical box of the scanning optical device in the color printer according to the embodiment of the present disclosure.
Figure 5B:
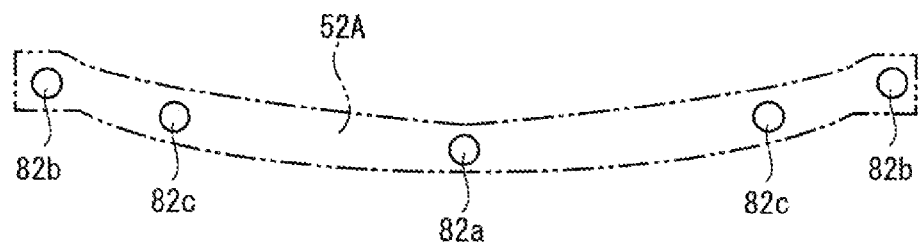
Figure 6A:
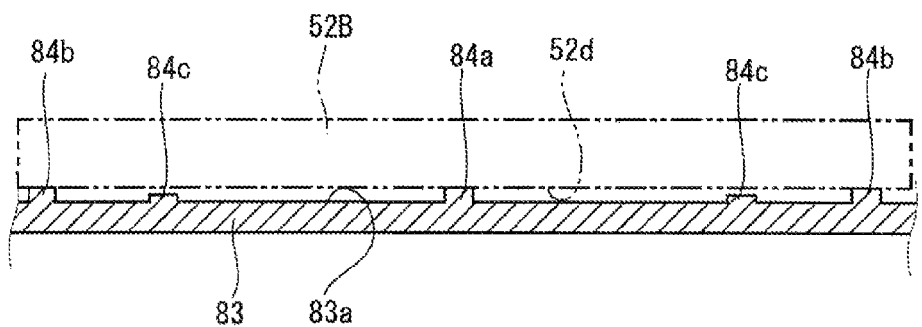
FIG. 6A is a front and FIG. 6B is a plan view each showing a second frame part of the optical box of the scanning optical device in the color printer according to the embodiment of the present disclosure.
Figure 6B:
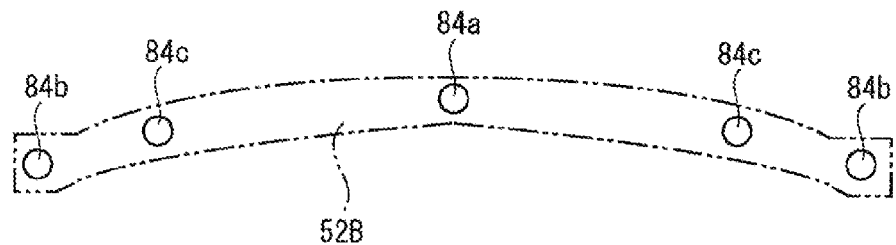

Next, with reference to FIG. 2, FIG. 3, FIG. 4A, FIG. 4B, FIG. 5A, FIG. 5B, FIG. 6A AND FIG. 6B, the scanning optical device 6 will be described. FIG. 2 is a plan view showing the scanning optical device. FIG. 3 is a side view showing the scanning optical device. FIG. 4A is a front view and FIG. 4B is a plan view each showing a pedestal of an optical box of the scanning optical device. FIG. 5A is a front and FIG. 5B is a plan view each showing a first frame part of the optical box of the scanning optical device. FIG. 6A is a front and FIG. 6B is a plan view each showing a second frame part of the optical box of the scanning optical device.

The scanning optical device 6 includes two light sources 30A, 30B (not shown in FIG. 3) each emitting a laser beam, a deflector 40 deflecting each laser beam, first and second optical component groups 50A, 50B each focusing the deflected laser beam and forming an image on the photoconductive drum 10 and an optical box 70 (not shown in FIG. 2) storing the light sources 30A, 30B, the deflector 40 and the first and second optical component groups 50A, 50B. The optical box 70 has a flat rectangular box-like shape.

Two light sources 30A, 30B are arranged on one end in the main scanning direction in the optical box 70 with an interval in the sub-scanning direction. The deflector 40 is arranged at an approximately center portion of the optical box 70. The first and second optical component groups 50A, 50B are arranged on both sides of the deflector 40 in the sub-scanning direction in the optical box 70.

The light sources 30A, 30B are laser oscillators generating laser beams and emitting the laser beams toward the deflector 40 via collimator lenses 31A, 31B and cylindrical lenses 32A, 32B, respectively. The collimator lenses 31A, 31B invert the laser beams emitted from the light sources 30A, 30B into parallel beams, respectively. The cylindrical lenses 32A, 32B focus the laser beams in the sub-scanning direction to form line images extending in the main scanning direction.

The deflector 40 deflects the laser beams emitted from the light sources 30A, 30B into the first optical component group 50A and the second optical component group 50B, respectively. The deflector 40 has a polygon mirror 41 and a polygon motor 42 rotating the polygon mirror 41, and is supported by a base plate 43. The base plate 43 is equipped with a heat sink 44. The base plate 43 is supported to the optical box 70 such that a rotation axis of the polygon mirror 41 directs in the vertical direction.

The first optical component group 50A and the second optical component group 50B focus the laser beams deflected by the deflector 40 to form images on the photosensitive drums 10. The first optical component group 50A and the second optical component group 50B have the similar configuration containing first fθ lenses 51A, 51B, second fθ lenses 52A, 52B, first mirrors 53A, 53B, second mirrors 54A, 54B and third mirrors 55A, 55B, respectively. The first fθ lenses 51A, 51B are arranged on the upstream side and the second fθ lenses 52A, 52B are arranged on the downstream side of the optical paths of the laser beams deflected by the deflector 40. The first mirrors 53A, 53B, the second mirrors 54A, 54B and the third mirrors 55A, 55B are arranged on the downstream side from the second fθ lenses 52A, 52B, respectively. Hereinafter, the upstream side and the downstream side respectively indicate the upstream side and the downstream side on the optical path of the beam deflected by the deflector 40.

The first fθ lenses 51A, 51B are configured to keep scanning speeds of the laser beams deflected by the deflector 40 constant on the photosensitive drums 10 and focus the laser beams deflected by the deflector 40 in the main scanning direction. As shown in FIG. 2, each of the first fθ lenses 51A, 51B has an incident face 51a formed in a recessed face on the side of the deflector 40, an emission face 51b formed in a protruded face on the opposite side to the deflector 40 and flat horizontal upper and lower faces 51c, 51d which are parallel with an optical axis of the laser beam deflected by the deflector 40. The incident face 51a and the emission face 51b are formed into cylindrical faces in the main scanning direction. The first fθ lenses 51A, 51B are made of resin, such as polycarbonate resin, used for conventional optical components.

The second fθ lenses 52A, 52B are configured to focus the laser beams passed through the first fθ lenses 51A, 51B in the sub-scanning direction and have length longer than that of the first fθ lenses 51A, 51B, respectively. Each of the second fθ lenses 52A, 52B has an incident face 52a formed in a recessed face on the side of the deflector 40, an emission face 52b formed in a protruded face on the opposite side to the deflector 40 and flat horizontal upper and lower faces 52c, 52d which are parallel with the optical axis of the laser beam deflected by the deflector 40. The incident face 52a and the emission face 52b are formed into cylindrical faces each having a toroidal surface in the sub-scanning direction. The second fθ lenses 52A, 52B are made of resin, such as polycarbonate resin, used for conventional optical components.

The first mirrors 53A, 53B are plane mirrors of a length longer than that of the second fθ lenses 52A, 52B and arranged on the downstream side from the second fθ lenses 52A, 52B, respectively. As shown in FIG. 3, the first mirrors 53A, 53B are arranged such that reflective faces 53a respectively face the second fθ lenses 52A, 52B and direct in the obliquely downward direction at an angle of 45° with respect to a horizontal plane. Therefore, the first mirrors 53A, 53B reflect the laser beams passed through the second fθ lenses 52A, 52B in the downward direction perpendicular to the optical axis, respectively.

The second mirrors 54A, 54B are plane mirrors of a length longer than that of the first mirrors 53A, 53B and arranged under the first mirrors 53A, 53B, respectively. As shown in FIG. 3, the second mirrors 54A, 54B are arranged such that reflective faces 54a respectively face the first mirrors 53A, 53B and direct in the obliquely upward direction at an angle of 45° with respect to the horizontal plane. Therefore, the second mirrors 54A, 54B reflect the laser beams reflected by the first mirrors 53A, 53B toward the side of the deflector 40, respectively.

The third mirrors 55A, 55B are plane mirrors of almost the same length as that of the second mirrors 54A, 54B and arranged nearer to the deflector 40 from the second mirrors 54A, 54B, respectively. As shown in FIG. 3, the third mirrors 55A, 55B are arranged such that reflective faces 54a direct in the obliquely upward direction at an angle of 40° with respect to the horizontal plane. Therefore, the third mirrors 55A, 55B reflect the laser beams reflected by the second mirrors 54A, 54B toward the photosensitive drums 10 in the obliquely upward direction, respectively.

The optical box 70 is constituted of an upper plate 71, a bottom plate 72, a side plate 73, as shown in FIG. 3. The optical box 70 is made of resin having a low linear expansion coefficient in order to prevent thermal deformation. The optical box 70 has a linear expansion coefficient smaller than that of the resin, such as polycarbonate, which is a material of the first and second fθ lenses 51, 52.

The upper plate 71 of the optical box 70 is formed with windows 71a through which the laser beams reflected by the third mirrors 55A, 55B of the first and second optical component groups 50A, 50B are radiated toward the photosensitive drums 10, respectively.

At approximately the center portion of the bottom plate 72 of the optical box 70, an opening 72a into which the deflector 40 is installed is formed. On both sides of the opening 72a in the sub-scanning directions, rectangular pedestals 75A, 75B are formed rising from the upper surface of the bottom plate 72. Each of the pedestals 75A, 75B has a flat horizontal upper surface 75a extending in the main scanning direction.

As shown in FIG. 4a and FIG. 4B, on the upper surface 75a of each pedestals 75A, 75B, a center side seating face 76a and end side seating faces 76b are formed at predetermined intervals corresponding to the center portion and each end portions along the plan shape of each first fθ lenses 51A, 51B, respectively. The center side seating face 76a and the end side seating faces 76b have the same height and flat horizontal upper surfaces. Between the center side seating face 76a and each end side seating face 76b, protruded parts 76c are formed. Each protruded part 76c has a height lower than that of the center side seating face 76a and the end side seating faces 76b and has a flat horizontal upper surfaces.

As shown in FIG. 3, on the side of the first optical component group 50A in the optical box 70, a first frame part 81 is formed outside the pedestal 75A. The first frame part 81 is integrally formed with the side plate 73 extending at a higher position than the upper surface 75a of the pedestal 75A in the main scanning direction. A lower surface 81a of the first frame part 81 is a flat horizontal surface extending in the main scanning direction.

As shown in FIG. 5A and FIG. 5B, on the lower surface 81a of the first frame part 81, a center side seating face 82a and end side seating faces 82b are formed at predetermined intervals corresponding to the center portion and each end portions along the plan shape of the second fθ lens 52A. The center side seating face 82a and the end side seating faces 82b have the same height and flat horizontal lower surfaces. Between the center side seating face 82a and each end side seating face 82b, protruded parts 82c are formed. Each protruded part 82c has a height lower than that of the center side seating face 82a and the end side seating faces 82b and has a flat horizontal lower surfaces.

As shown in FIG. 3, on the side of the second optical component group 50B in the optical box 70, a second frame part 83 is formed outside the pedestal 75B. The second frame part 83 is integrally formed with the side plate 73 extending at a lower position than the upper surface 75a of the pedestal 75B in the main scanning direction. An upper surface 83a of the second frame part 83 is a flat horizontal surface extending in the main scanning direction.

As shown in FIG. 6A and FIG. 6B, on the upper surface 83a of the second frame part 83, a center side seating face 84a and end side seating faces 84b are formed at predetermined intervals corresponding to the center portion and each end portions along the plane shape of the second fθ lens 52B. The center side seating face 84a and the end side seating faces 84b have the same height and flat horizontal upper surfaces. Between the center side seating face 84a and each end side seating face 84b, protruded parts 84c are formed. Each protruded part 84c has a height lower than that of the center side seating face 84a and the end side seating faces 84b and has a flat horizontal upper surface. The positional relationship of the center side seating face 84a, the end side seating faces 84b and the protrude parts 84c is the same as that of the center side seating face 82a, the end side seating faces 82b and the protruded parts 82c of the first frame part 81.

As shown in FIG. 4A and FIG. 4B, the first fθ lenses 51A, 51B of the first and second optical component groups 50A, 50B are supported on the upper surfaces 75a of the pedestals 75A, 75B of the optical box 70, respectively. The center portion and both end portions of each first fθ lenses 51A, 51B are respectively placed on the center side seating faces 76a and the end side seating faces 76b. Furthermore, the middle portions between the center portion and each end portions of each first fθ lenses 51A, 51B are adhered on the upper surfaces of the protruded parts 76c with an adhesive. As the adhesive, a UV (ultra violet) curing adhesive may be employed.

As shown in FIG. 5A and FIG. 5B, the second fθ lens 52A of the first optical component group 50A is supported on the lower surface 81a of the first frame part 81. The center portion and both end portions of the second fθ lens 52A respectively contacts with the center side seating face 82a and the end side seating faces 82b. Furthermore, the middle portions between the center portion and each end portions of the second fθ lens 52A are adhered on the lower surfaces of the protruded parts 82c with an adhesive. As the adhesive, a UV (ultra violet) curing adhesive may be employed.

As shown in FIG. 6A and FIG. 6B, the second fθ lens 52B of the second optical component group 50B is supported on the upper surface 83a of the second frame part 83. The center portion and both end portions of the second fθ lenses 52B are respectively placed on the center side seating face 84a and the end side seating faces 84b. Furthermore, the middle portions between the center portion and each end portions of the second fθ lens 52B are adhered on the upper surfaces of the protruded parts 84c with an adhesive. As the adhesive, a UV (ultra violet) curing adhesive may be employed.

Figure 7A:
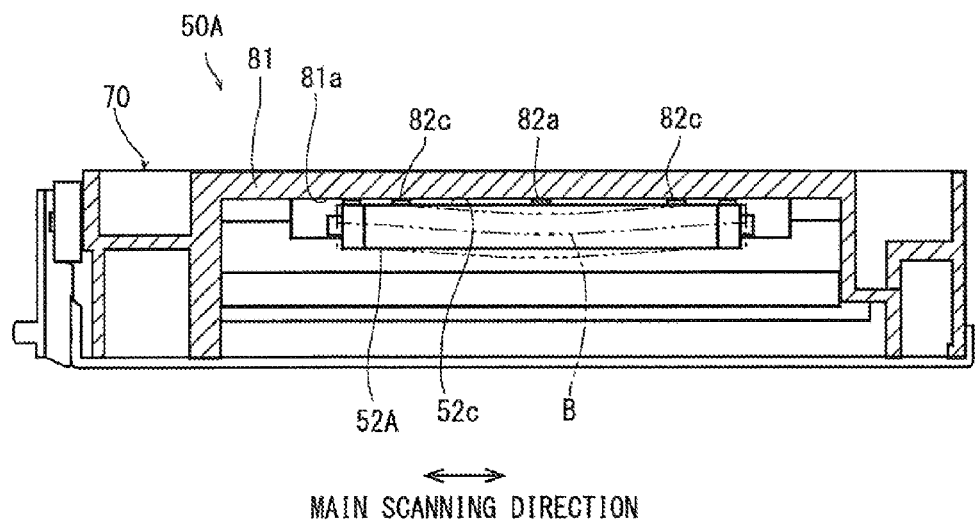
FIGS. 7A and 7B are views showing a deformation of a second fθ lens of the scanning optical device in the color printer according to the embodiment of the present disclosure.

In the scanning optical device 6 having the above-mentioned configuration, the second fθ lenses 52A, 52B of the first and second optical component groups 50A, 50B under thermal deformation will be described with reference to FIG. 3, FIG. 7A and FIG. 7B. FIG. 7A is a back view showing the second fθ lens of the first optical component group in the scanning optical device, and FIG. 7B is a front view showing the second fθ lens of the second optical component group in the scanning optical device.

In the first optical component group 50A, the second fθ lens 52A is deformed as shown in the two-dot line in FIG. 7A because of a higher linear expansion coefficient than that of the optical box 70 constituting the first frame part 81. That is, because the second fθ lens 52A has a larger deformation amount than that of the first frame part 81 between two protruded parts 82c to which the second fθ lens 52A is adhered, the second fθ lens 52A deforms such that a portion between two protruded parts 82c curves downward in an arc shape separated away from the center side seating face 82a. Furthermore, both end portions outside the protruded parts 82c expand outwardly.

Because of the cylindrical shape, when the second fθ lens 52A deforms, a bus line B extending in a direction corresponding to the main scanning direction of the second fθ lens 52A also deforms in a shape corresponding to the deformed shape of the second fθ lens 52A. That is, the bus line B curves downward in an arc shape. Accordingly, the laser beam incident into the second fθ lens 52A lineally along the main scanning direction is radiated with a curved shape protruded downward.

Figure 7B:
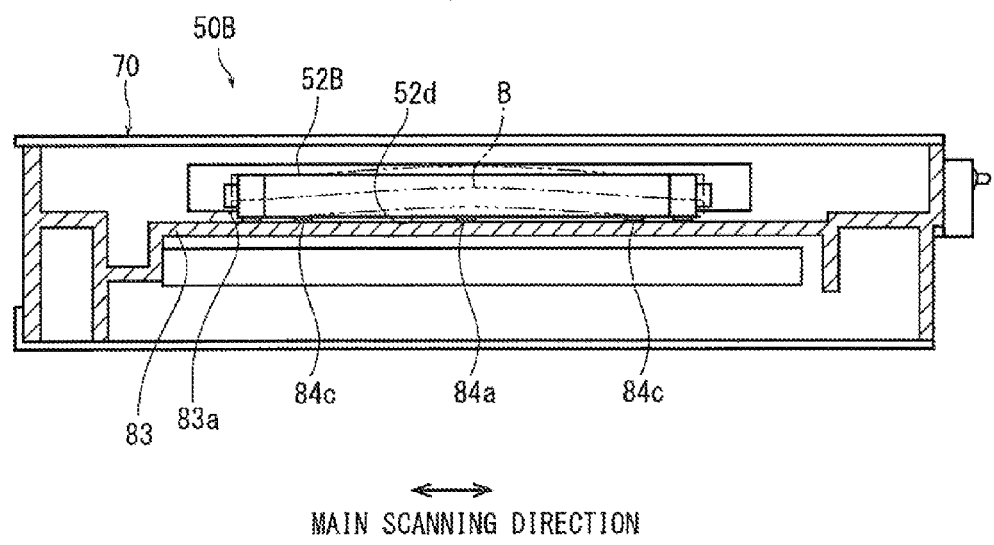

In the second optical component group 50B, the second fθ lens 52B is deformed as shown in the two-dot line in FIG. 7B because of a higher linear expansion coefficient than that of the optical box 70 constituting the second frame part 83. That is, since the second fθ lens 52B has a larger deformation amount than that of the second frame part 83 between two protruded parts 84c to which the second fθ lens 52B is adhered, the second fθ lens 52B deforms such that a portion between two protruded parts 84c curves upward in an arc shape separated away from the center side seating face 84a. Furthermore, both end portions outside the protruded parts 84c expand outwardly.

Because of the cylindrical shape, when the second fθ lens 52B deforms, the bus line B extending in a direction corresponding to the main scanning direction of the second fθ lens 52B also deforms in a shape corresponding to the deformed shape of the second fθ lens 52B. That is, the bus line B curves upward in an arc shape. Accordingly, the laser beam incident into the second fθ lens 52B lineally along the main scanning direction is radiated with a curved shape protruded upward.

The laser beam advancing in the scanning optical device 6 will be described with reference to FIG. 3. The laser beam incident to the second fθ lens 52A through the first fθ lens 51A in the first optical component group 50A is radiated from a position (shown in the two-dot line in FIG. 3) displaced downward from the original optical axis (shown in the thick solid line in FIG. 3). Then, the laser beam is turned by the first mirror 53A and the second mirror 54A and then reflected toward the photosensitive drum 10 by the third mirror 55A while displacing in +Y direction in the sub-scanning direction from the original optical axis.

On the other hands, the laser beam incident to the second fθ lens 52B through the first fθ lens 51B in the second optical component group 50B is radiated from a position (shown in the two-dot line in FIG. 3) displaced upward from the original optical axis (shown in the thick solid line in FIG. 3). Then, the laser beam is turned by the first mirror 53B and the second mirror 54B and then reflected toward the photosensitive drum 10 by the third mirror 55B while displacing in +Y direction in the sub-scanning direction from the original optical axis.

As described above, in the scanning optical device 6 in the color printer 1 according to the embodiment of the present disclosure, the directions of the laser beams radiated toward the photosensitive drums 10 displaced from the original optical axis are the same direction in the first optical group 50A and the second optical group 50B. Furthermore, since the second fθ lenses 52A, 52B are respectively adhered at the same positions to the protruded parts 82c, 84c, the curved shape and displacement amount of each image formed on the photosensitive drums 10 are almost the same. Accordingly, color registration can be precisely aligned and, therefore, color irregularity is not caused. Although the color registration is carried out with the curved image, an actual curved amount is so small of about several tens microns at the maximum that the deformation cannot be recognized by human eyes.

In the present embodiment, since the curvature of the second fθ lenses 52A, 52B due to the thermal deformation is allowed in advance, the deformation of the second fθ lenses 52A, 52B makes it possible to absorb the difference in the linear expansion coefficients between the second fθ lenses 52A, 52B and the optical box 70. Furthermore, since the second fθ lenses 52A, 52B are respectively adhered on two protruded parts 82c, 84c, a sufficient adhesion strength can be obtained, resulting in stable supporting of the second fθ lenses 52A, 52B to the optical box 70.

Although the second fθ lenses 52A, 52B are adhered to the optical box 70 at two protruded parts 82c, 84c in the first and second optical component groups 50A, 50B in the present embodiment, the second fθ lenses 52A, 52B may be adhered at two or more adhesion portions if the difference in deformation amount due to the difference in liner expansion coefficients can be absorbed.

Although the second fθ lenses 52A, 52B are adhered to the optical box 70 at the same adhesion portions in the first and second optical component groups 50A, 50B in the present embodiment, it is not necessary to adhere the second fθ lenses 52A, 52B at the same adhesion portions. If the second fθ lenses 52A, 52B are adhered to the optical box 70 at the different adhesion portions in the first and second optical component groups 50A, 50B, the curvature shape and the displacement amount may be different each other in each optical component group. However, if the second fθ lenses 52A, 52B in the first and second optical component groups 50A, 50B are thermally deformed in the opposite directions each other, the alignment of color registration can be carried out without causing problems.

The embodiment was described in a case of applying the configuration of the present disclosure to the color printer 1. On the other hand, in another embodiment, the configuration of the disclosure may be applied to another image forming apparatus, such as a copying machine, a facsimile or a multifunction peripheral, except for the printer 1.

While the present disclosure has been described with reference to the particular illustrative embodiments, it is not to be restricted by the embodiments. It is to be appreciated that those skilled in the art can change or modify the embodiments without departing from the scope and spirit of the present disclosure.

What is claimed is:

1. A scanning optical device comprising:
    a deflector deflecting a light beam emitted from a light source,
    a pair of optical component groups arranged on both sides of the deflector in a sub-scanning direction and focusing the light beams deflected by the deflector to form images on a surface of an image carrier, and
    an optical box supporting the deflector and the optical component groups,
    wherein each of the optical component groups includes
        a lens focusing the light beam deflected by the deflector in the sub-scanning direction, and
        a mirror reflecting the light beam passed through the lens toward the surface of the image carrier,
        one lens of one optical component group and the other lens of the other optical component group are supported so as to deform in the opposite directions each other in the sub-scanning direction when they are thermally deformed, and
    the one lens is supported to be capable of curving protruding downward in an arc shape and the other lens is supported to be capable of curving protruding upward in an arc shape, and
    wherein the optical box has horizontal supporting faces parallel to an optical axis of the lenses on both sides of the deflector, and
    an upper surface of the one lens is supported by one supporting face and a lower surface of the other lens is supported by the other supporting face.

2. The scanning optical device according to claim 1,
    wherein the supporting face is formed with a center side seating face and end side seating faces respectively corresponding to a center portion and end portions of the lens, and the lens is adhered to the supporting face between the center side seating face and the end side seating faces.

3. The scanning optical device according to claim 2,
    wherein the supporting face is formed with protruded parts having a height lower than that of the seating faces between the seating faces, and the lens is adhered on the protruded parts.

4. An image forming apparatus comprising a scanning optical device,
    wherein the scanning optical device including:
    a deflector deflecting a light beam emitted from a light source,
    a pair of optical component groups arranged on both sides of the deflector in a sub-scanning direction and focusing the light beams deflected by the deflector to form images on a surface of an image carrier, and
    an optical box supporting the deflector and the optical component groups,
    wherein each of the optical component groups includes
        a lens focusing the light beam deflected by the deflector in the sub-scanning direction, and
        a mirror reflecting the light beam passed through the lens toward the surface of the image carrier,
        one lens of one optical component group and the other lens of the other optical component group are supported so as to deform in the opposite directions each other in the sub-scanning direction when they are thermally deformed, and
    the one lens is supported to be capable of curving protruding downward in an arc shape and the other lens is supported to be capable of curving protruding upward in an arc shape, and
    wherein the optical box has horizontal supporting faces parallel to an optical axis of the lenses on both sides of the deflector, and
    an upper surface of the one lens is supported by one supporting face and a lower surface of the other lens is supported by the other supporting face.

5. The image forming apparatus according to claim 4,
    wherein the supporting face is formed with a center side seating face and end side seating faces respectively corresponding to a center portion and end portions of the lens, and the lens is adhered to the supporting face between the center side seating face and the end side seating faces.

6. The image forming apparatus according to claim 5, wherein the supporting face is formed with protruded parts having a height lower than that of the seating faces between the seating faces, and the lens is adhered on the protruded parts.

\* \* \* \* \*